Dec. 4, 1923.
J. W. MOON
1,476,537
APPARATUS FOR MANUFACTURING TUBES
Filed May 19, 1922  4 Sheets-Sheet 1
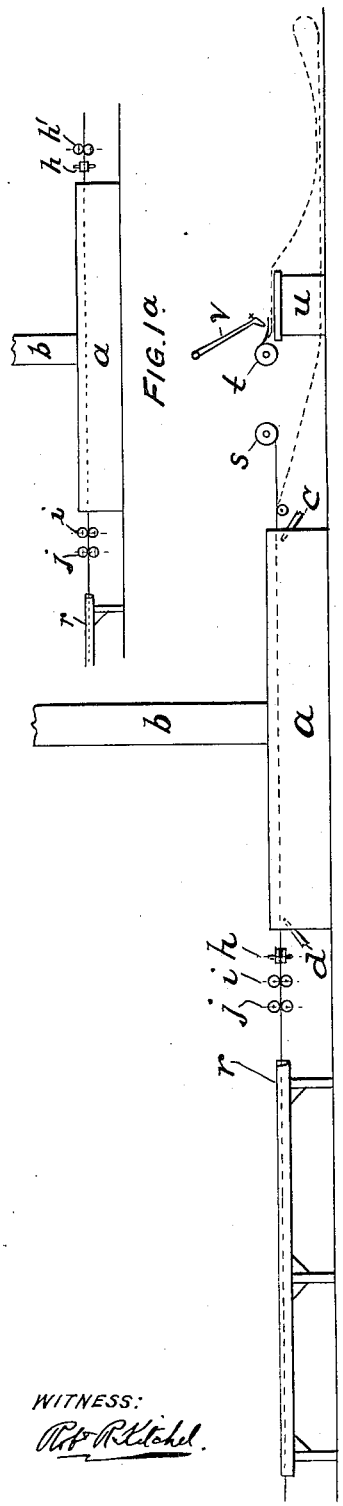
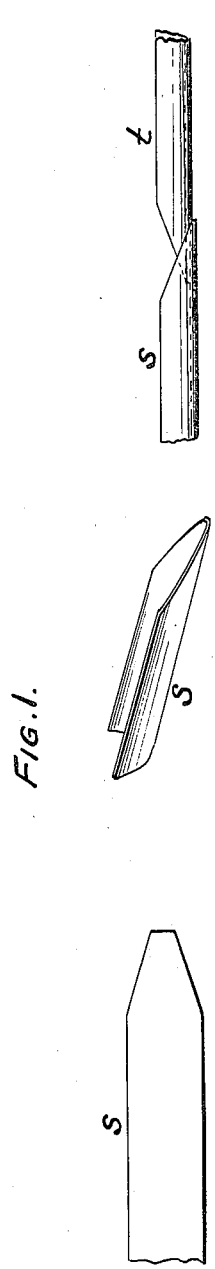
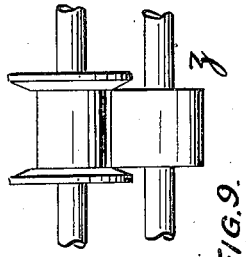
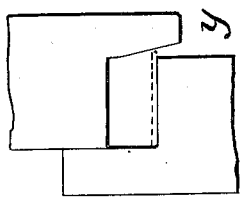
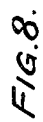
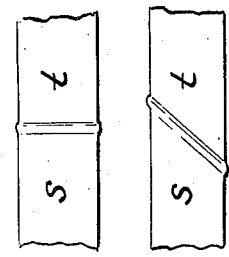
WITNESS:
R. R. Kitchel.
INVENTOR
John W. Moon
BY
Frank S. Busser
ATTORNEY.

Dec. 4, 1923.  
J. W. MOON  
APPARATUS FOR MANUFACTURING TUBES  
Filed May 19, 1922  
1,476,537  
4 Sheets-Sheet 2

WITNESS:

INVENTOR  
John W. Moon  
BY  
ATTORNEY.

Dec. 4, 1923.
J. W. MOON
1,476,537
APPARATUS FOR MANUFACTURING TUBES
Filed May 19, 1922      4 Sheets-Sheet 3
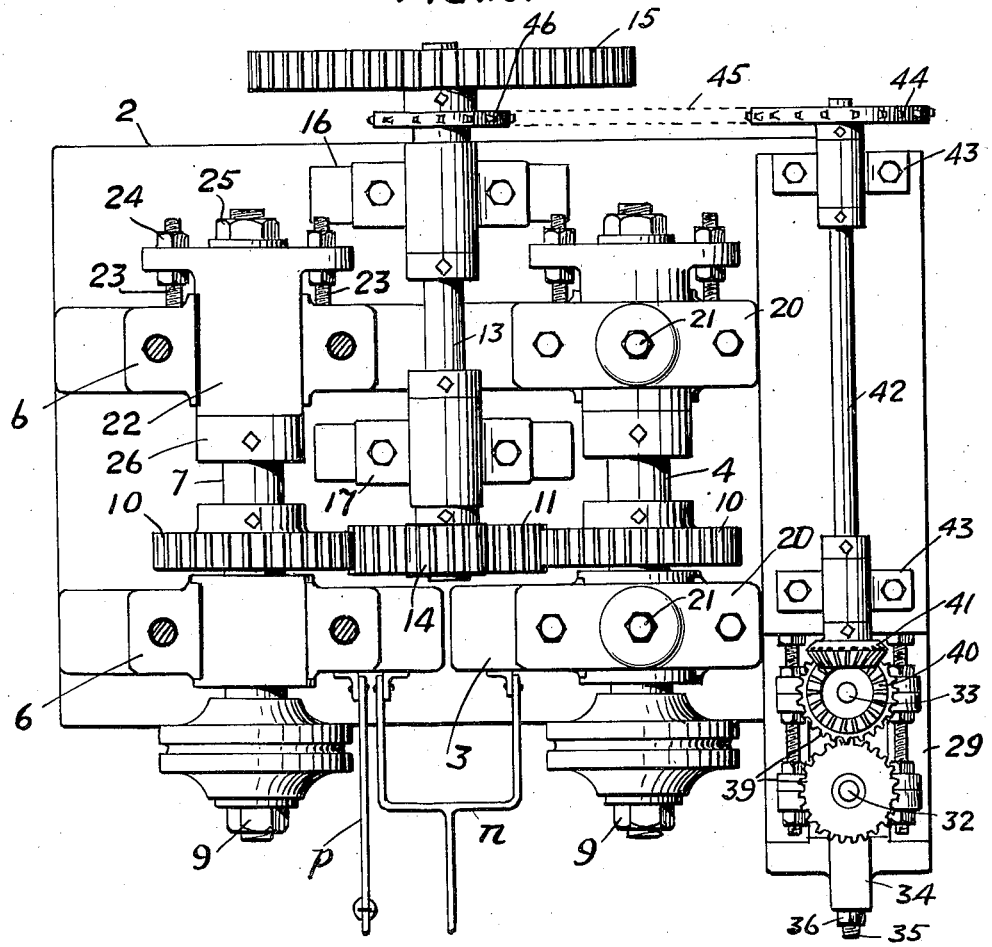
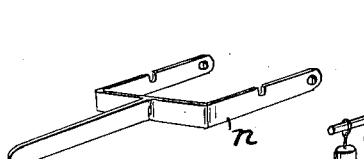
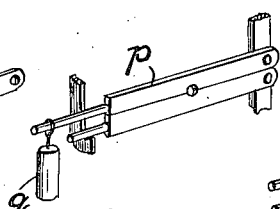
INVENTOR
John W. Moon
BY
ATTORNEY.
WITNESS:

Dec. 4, 1923. 1,476,537
J. W. MOON
APPARATUS FOR MANUFACTURING TUBES
Filed May 19, 1922 4 Sheets-Sheet 4

WITNESS:
Rob. R. Kitchel

INVENTOR
John W. Moon
BY Frank L. Busser
ATTORNEY.

Patented Dec. 4, 1923.

1,476,537

UNITED STATES PATENT OFFICE.

JOHN W. MOON, OF LANSDOWNE, PENNSYLVANIA, ASSIGNOR TO FRETZ-MOON TUBE COMPANY, OF PHILADELPHIA, PENNSYLVANIA, A CORPORATION OF PENNSYLVANIA.

APPARATUS FOR MANUFACTURING TUBES.

Application filed May 19, 1922. Serial No. 562,227.

*To all whom it may concern:*

Be it known that I, JOHN W. MOON, a citizen of the United States, residing at Lansdowne, county of Delaware and State of Pennsylvania, have invented a new and useful Improvement in Apparatus for Manufacturing Tubes, of which the following is a full, clear, and exact description, reference being had to the accompanying drawings, which form a part of this specification.

This invention relates to an improvement in apparatus for the manufacture of tubing in a continuous manner, and more particularly for manufacturing tubes by the method set forth in application Serial No. 452,267, filed March 14, 1921, and forms a continuation in part of said application. The claims directed to the apparatus originally filed with said application have been cancelled and inserted herein.

The object of my invention is to provide an apparatus adapted for manufacturing metallic tubing in a continuous manner and at a relatively high speed, with a minimum amount of floor space for the complete apparatus.

Another object of my invention is to provide such an apparatus in which the amount of skelp in the heating zone of the furnace is, at any time, less than required for a few minutes' run.

A further object of my invention is to provide a tube rolling mill which will be adapted to be adjusted for varying the speed in order to regulate the speed of the tube-forming apparatus in accordance with the heating of the skelp during its passage through the furnace, as well as an apparatus for forming tubes of different sizes within predetermined limits.

The apparatus, generally, comprises a furnace which is relatively long when compared to its width or height, and which may be heated in any desired manner, but in the specific form it is heated by liquid or gaseous fuel burners. The skelp is drawn in a continuous manner through the furnace and is heated from cold to a working heat during its passage therethrough, and is bent, welded and sized by sets of rolls as it emerges from the furnace, which rolls also draw the skelp through the furnace, and is then finally shaped and rolled to size by another set or sets of rolls while in a heated condition. The finished tube is delivered to a suitable table on which it is maintained in a straight condition while cooling, and is cut to suitable lengths during its movement.

The precise nature of my invention will best be understood by reference to the accompanying drawings, it being premised, however, that various changes may be made in the details of construction without departing from the spirit and scope of my invention as defined in the appended claims.

Fig. 1 is a diagram, in side elevation, of an apparatus for making tubes in a continuous manner.

Fig. 1ª is a similar view of another form of apparatus.

Fig. 4 is a plan view of the end of a strip of skelp such as may be used for making tubes.

Fig. 5 is a perspective view of the end of said strip of skelp after shaping for welding.

Fig. 6 is a side view of two ends of such skelp positioned for welding.

Fig. 7 is a plan view of two other forms of welding the ends of skelp to each other.

Fig. 8 is an end view of a pair of dies for shaping welds such as shown in Fig. 7.

Fig. 9 is a front view of a pair of rolls, which are also adapted for shaping the welds shown in Fig. 7.

Fig. 10 is a plan view of one form of mill adapted for forming tubes in accordance with my invention.

Fig. 13 is a perspective view of a skelp guide for the welding rolls.

Fig. 14 is a similar view of a tube guide between the sizing rolls.

Fig. 15 is a perspective view of a tube scraper.

Figure 2:
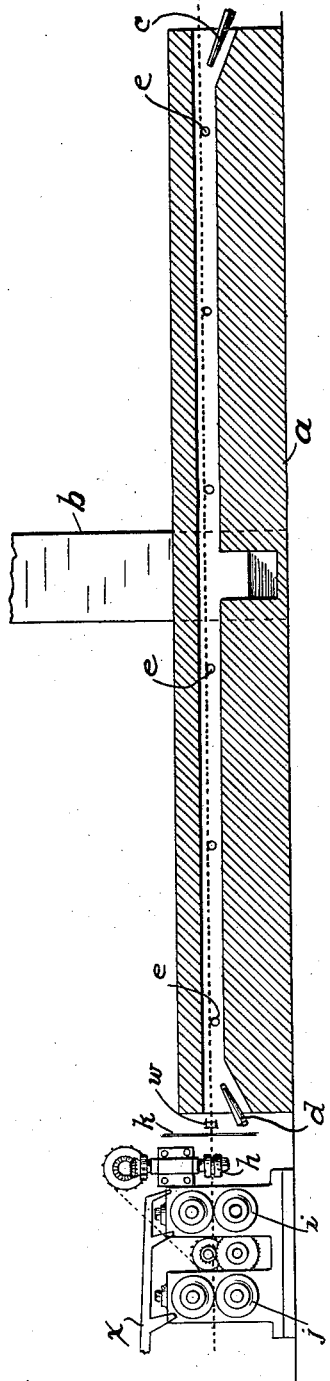
Fig. 2 is a side view, partially in section, of a tube forming mill and the furnace, which is somewhat diagrammatic.

In these drawings, the reference character *a* designates a long furnace of small cross-sectional area having a stack *b* in communication with the combustion chamber near its central portion.

*c* and *d* are burners which are supplied with either liquid or gaseous fuel, together with sufficient air to form a combustible mixture. The burner c is directed into the combustion chamber through the charging end of the furnace, while the burner d projects into the combustion chamber through the withdrawal end of the furnace.

Extending transversely through the furnace in the plane of the combustion chamber are tubular supports e for the skelp while passing through the furnace, and which are connected with a cold water inlet pipe f and an outlet pipe g for circulating water through the supports to prevent their burning off.

h are the bending and welding rolls of a tube rolling mill rotatable on vertical axes, and i and j are two sets of sizing rolls which are rotatable about horizontal axes. k is a skelp guide in front of the rolls h and in back of a protecting shield m between the furnace and the tube rolling mill. Pivoted between the sets of rolls i and j is a tube guide n and a tube scraper p, the latter having a weight q for holding the scraper in contact with the tube to scrape the scale therefrom before passing to the final sizing rolls j. Located beyond the rolling mill is a straightening table having a plurality of troughs r for the reception of the tube as it passes from the mill. s and t are two rolls of skelp at the charging end of the furnace. u is a table on which the ends of the skelp from the rolls s and t are supported while the ends thereof are welded together. v is a torch for welding the ends of the rolls of skelp to each other.

The operation of forming tubes with apparatus illustrated is as follows:

The furnace is first fired and heated to the proper temperature to heat the skelp from cold to the working heat during its passage therethrough. This temperature is dependent upon the speed of travel of the skelp through the furnace, the thickness of skelp, and the length of the furnace. For example, in several mills now in operation I am using furnaces about twenty-five feet in length and the skelp for making one-eighth inch pipe is drawn through the furnace at the rate of about fifty feet per minute. The furnaces at the withdrawal end and for quite a distance toward the intermediate portion are heated to a white heat.

After the furnace has been heated to the proper temperature, a tang is secured to the end of a roll of skelp such as s. The tang is passed through the furnace or laid therein by removing the cover and the forward end is passed through an opening in shield m and is entered in the pass between rolls h and i, it being assumed that the rolls are driven at the proper speeds by mechanism hereinafter described. The tube guide k is then raised (by hand) to guide the tang into the pass between rolls j and after passing therefrom is passed to a trough r. The scraper p is now positioned about the tube to scrape the scale therefrom just before it passes to rolls j. The mill is now maintained in continuous operation to bend and weld the skelp during its passage between rolls h, shape and partially size the tube in its passage between rolls i and finally shape to gage during its passage between rolls j.

I prefer to drive the rolls i and j at the same peripheral speeds and at a slightly higher peripheral speed than the bending and welding rolls h so that the tube is drawn through rolls h to a slight degree at least. This arrangement permits me to adjust rolls j to form the tube of the proper gage, and as the tube is drawn through rolls h, rolls i can be adjusted to prevent buckling between the different sets of rolls.

As the speeds of the rolls may readily be raised as hereinafter described, it will be appreciated that the skelp can be delivered to the rolls h at the proper welding heat by increasing the speed of the mill if the skelp is being heated too rapidly or by decreasing the speed if it is being heated too slowly. It will be understood that in all cases the temperature of the furnace is above that required to heat the skelp to the proper heat if it were allowed to remain stationary in the furnace for a substantial time.

If desired, I may heat the skelp to about the cinder stage during its passage through the furnace and raise the temperature of the edges thereof after it passes from the furnace and before it reaches the rolls h by directing blasts of air against the skelp or edges thereof through pipes w, which not only raises the temperature thereof, but also cleans the edges to be welded; or if the blast is omitted, the skelp is heated to a welding heat before leaving the furnace.

The rolls are cooled and the scale is blown from the tube during the forming operation by an air blast delivered through a pipe x having nozzles directed to the desired points.

When nearing the end of the roll s of the skelp, it is unrolled, carried beyond the table u, bent upon itself, and the end thereof placed into welding position with the end of the outer convolute of a newly positioned roll t and welded thereto, and the roll t may then be placed in the position previously occupied by roll s. After the slack between the furnace and the new roll of skelp has been taken up, the skelp will be drawn from the new roll. As the joint between two pieces of skelp (if unfinished as hereinafter described) passes from the furnace, skelp guide k is raised to its guiding position in front of rolls h to guide the new piece of skelp horizontally to rolls h, which position will be maintained without the use of a guide if started horizontally.

The ends of the pieces of skelp may be secured by welding or in any other desired manner. I prefer, however, to weld the ends to each other and have shown a plurality of such forms of joints. The joint shown in Fig. 6 is formed by first tapering the ends of the skelp as shown in Fig. 4, then bending the end portions to shape as shown in Fig. 5, and then placing the ends together as shown in Fig. 6, and weld by means of the torch $v$ while on the table $u$. When this method is used, the ends are tapered to reduce the metal at the joint, so as to avoid crowding the rolls during the passage of the joint through the roll, and when so joined it is necessary to use the guide $k$.

In Fig. 7 I have shown electrically welded joints. When such joints are used, the surplus metal at the joints may be reduced by dies $y$ such as shown in Fig. 8, or rolls $z$ as shown in Fig. 9, between which the metal at the joint is reduced to the gage of the skelp while still in a heated condition from the welding operation. The metal reducing device is placed on table $u$ at the end remote from the furnace and when the skelp is bent upon itself after uncoiling ro ls $s$, it is placed between the members of the reducing device, so that after the weld is made, the joint may be drawn into the reducing device while the skelp extending from the furnace is slack, and after the joint has been reduced the skelp is withdrawn from said device after separation of its members, so that the skelp may be drawn direct from the new roll after the slack has been taken up.

When this method is used, it is not necessary to use a guide such as $k$, and as the joint is the same gage as the skelp at the sides thereof, the tube will be continuous and perfectly formed at such portion and need not be cut out after it passes through the mill, which operation is necessary when joints such as shown in Fig. 6 are made.

The tube rolling mill comprises a base 2 to which are secured housings 3, 3 for the upper and lower spindles 4 and 5, respectively, for the set of rolls $i$, and 6 are similar housings for the spindles 7 and 8 for the upper and lower rolls $j$. These rolls are all secured to the ends of their shafts or spindles by nuts 9. Secured to each of the shafts 4, 5, 7 and 8 is a gear wheel 10, all of which are the same pitch diameter. The gears 10 on shafts 4 and 5 are in mesh with each other, while the gears 10 on shafts 7 and 8 are similarly engaged. 11 is a gear wheel on a shaft 12 which meshes with gears 10 on shafts 5 and 8, or the lower shafts of each set of rolls $i$ and $j$. 13 is the driving shaft for the rolls, having a pinion 14 thereon which meshes with the gear 11, the shaft 13 being driven by a gear 15, as shown in Fig. 10.

Figure 11:
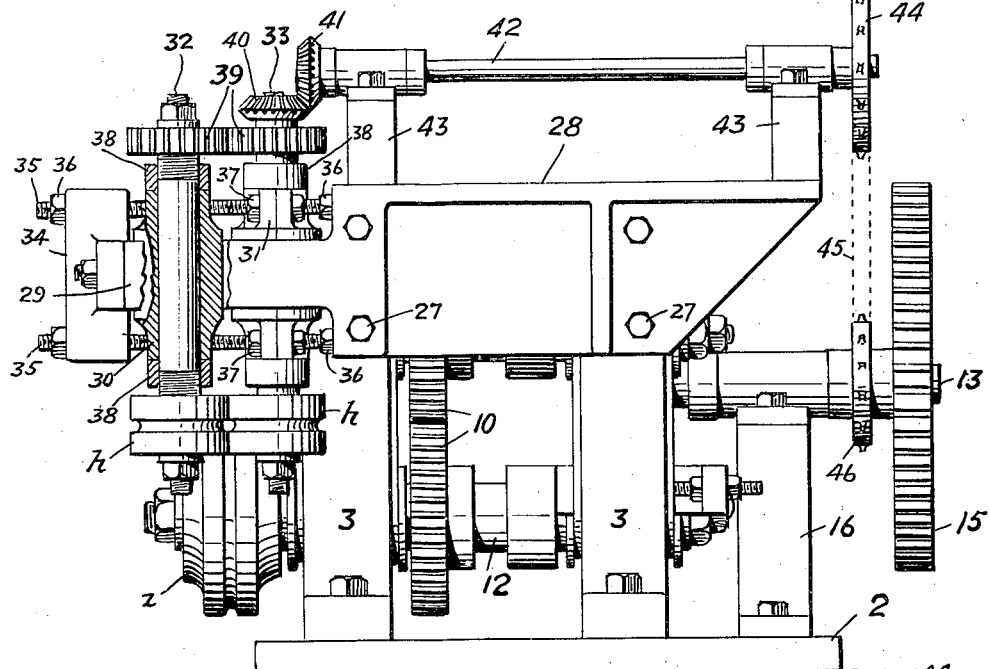
Fig. 11 is an end view thereof, partially in section.
Figure 12:
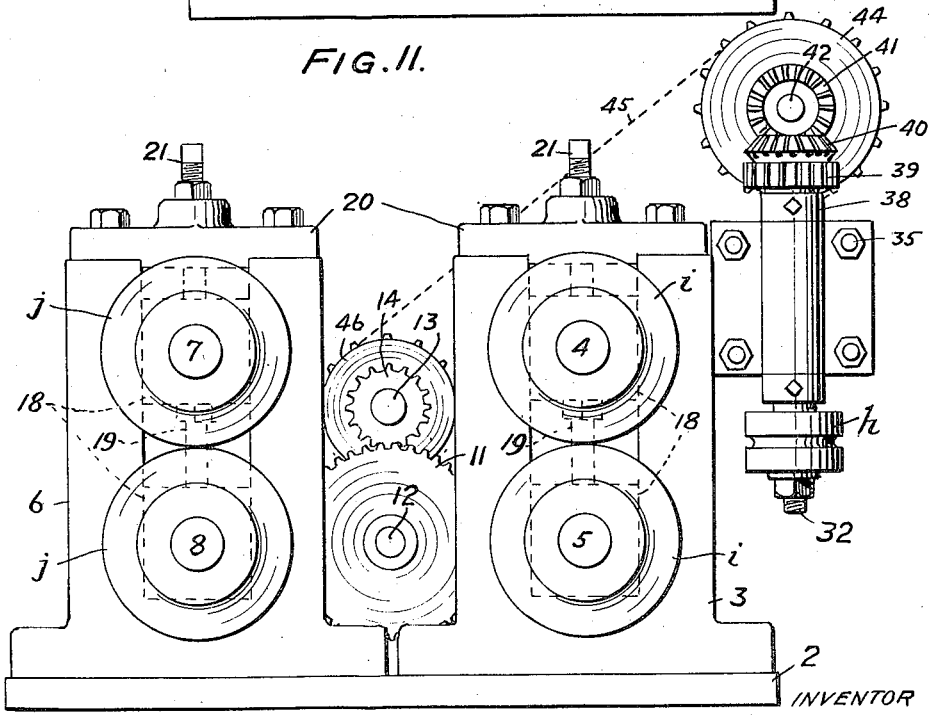
Fig. 12 is a front view.

The shafts 12 and 13 are journaled in bearings in standards 16 and 17 secured to the base 2 between the rear housings 3 and 6, the standard 17 being omitted from Fig. 11 for clearness.

The front or roll end of each of the spindles is journaled in a bearing 18. The bearings for the lower spindles 5 and 8 rest on the bottom forming portions of housing windows, while the bearings 18 for the upper spindles 4 and 7 are adjustable in a vertical direction in said windows. 19 are adjustable supporting screws for the upper bearings 18 and are usually set so as to prevent the upper and lower rolls of the sets $i$ and $j$ from contacting when the rolls are running idle. Connected to the tops of each of the horizontal roll housings and across the windows thereof is a cap 20. 21 are adjusting screws in said caps for limiting the upward movement of the roll spindle bearings when metal is between the rolls.

The rear ends of the roll spindles 4, 5, 6 and 7 are journaled respectively in bearings 22, each of which, by means of nuts 24, is arranged to be adjusted longitudinally in the window of its housing along screws 23 carried by the housings (see Fig. 10).

The spindles 4, 5, 6 and 7 are held against endwise movement in bearings 22, by means of collars 26 secured to the spindle on one side of the bearing and nuts 25 on the ends of the spindles on the other side of the bearing. The nuts 25 engage washers on the spindles and confine them against the bearings 22. The spindles are free to rotate in bearings 22, but are fixed against longitudinal movement therein, so that said bearings may be adjusted longitudinally to align the grooves in the different rolls with each other. These bearings 22 are held and adjusted vertically in the windows of the housings in a manner similar to the front bearings 18.

Connected to the housings 3, by bolts 27, is a frame 28 having a horizontally disposed housing 29 at one end thereof with a vertically disposed window. Mounted for transverse adjustment in the window of housing 29 are split bearings 30 and 31 for the spindles 32 and 33, respectively, for rolls $h$, $h$. These bearings are provided with upper and lower projections which engage the housing 29, which forms a guide therefor. Extending from the frame 28 through both members of bearings 30 and 31 and a cap 34 secured to both members of housing 29 are four screws 35. These screws are secured in position to the frame 28 and cap 34 by nuts 36. 37 are nuts for adjusting the bearings 30 and 31 and for securing the members thereof about the spindles 32 and 33. The rolls $h$ are secured to the lower ends of their spindles 32 and 33 by nuts which jam them against shoulders on the spindles. Jammed against very narrow upper and lower shoulders on the spindles 32 and 33 are threaded collars 38, which engage the upper and lower faces of the bearings 30 and 31 and prevent longitudinal movement of said spindles. Connected to the upper ends of the spindles 32 and 33 are spur gears 39, 39, which are in mesh with each other and are of the same pitch diameter. Connected to the upper end of spindle 33 is a bevel gear 40. This bevel gear meshes with a gear 41 on shaft 42, which is journaled in standards 43 on frame 28. 44 is a sprocket wheel secured to shaft 42, which is driven by a sprocket chain 45 connected to a sprocket wheel 46 secured to shaft 13.

Figure 3:
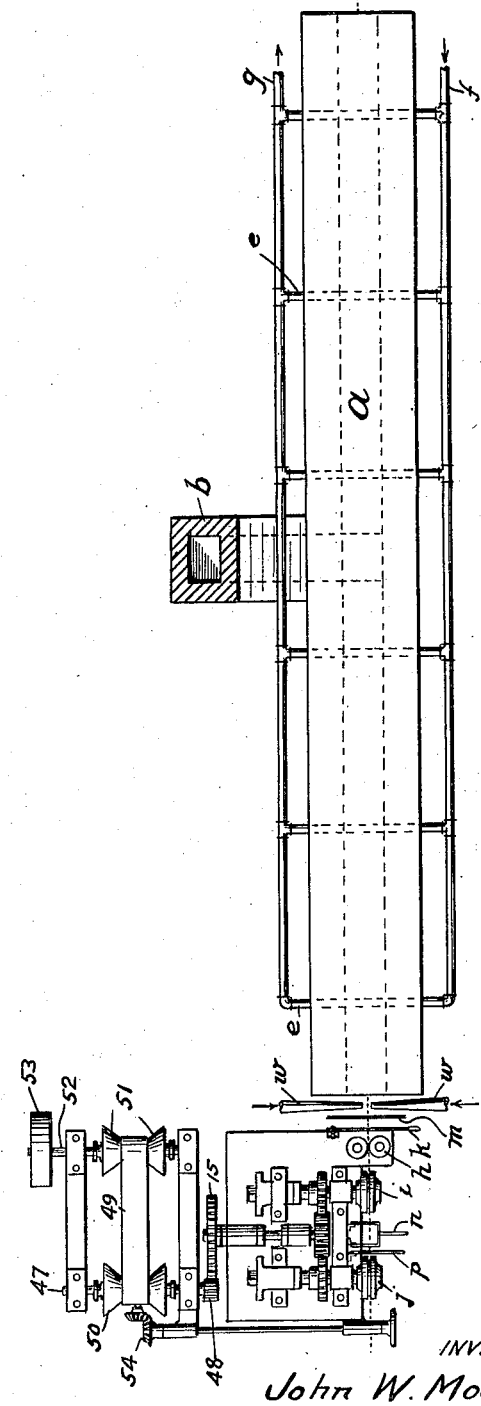
Fig. 3 is a plan view of Fig. 2.

By means of the gearing hereinbefore described all of the rolls are positively driven from the shaft 13. This shaft 13 is driven from a shaft 47 by a pinion 48 as shown in Fig. 3. Shaft 47 is driven by a belt 49, which engages cone pulleys 50 on the shaft 47 and similar pulleys 51 on shaft 52. 53 is a driving pulley on shaft 52 and is driven at substantially a constant speed. The cone pulleys are all of the same taper and are secured to their shafts so as to rotate therewith, but are free to be moved longitudinally thereon. Both sets of cone pulleys 50, 50 and 51, 51 are connected to adjusting mechanism 54 in such a manner that when one set is separated a predetermined distance, the other set is moved toward each other for the same distance, so that the speed of shaft 47 (and consequently the speed of the rolls of the mill) can be varied with relation to the speed of shaft 52 without varying the tension of belt 49.

By this means the operator is enabled to vary the speed of the mill in accordance with the heating of the furnace to deliver the skelp to the bending and welding rolls at the proper working temperature.

It is also possible to merely bend the skelp to substantially cylindrical form between the rolls $h$ and force the edges together and weld between rolls $i$. When, however, the apparatus is so used, the skelp must be heated to a sufficiently high temperature to prevent the edges thereof from cooling below the welding heat when the skelp enters the pass between rolls $i$.

It is also possible to place the furnace between the welding and bending rolls as shown in Fig. 1$^a$.

In this form of my invention, the bending may be done either by vertical rolls $h$, horizontal rolls $h'$, or a combination of horizontal and vertical rolls. If the horizontal rolls are only used, the skelp can only be bent to U-form, as one set of horizontal rolls are not adapted to bend a skelp from flat to cylindrical form.

The advantages of my invention result from the provision of an apparatus whereby tubing may be made in a continuous manner and whereby the length of tube made thereby is dependent only upon the length of time the apparatus is in operation, the number of tubes of predetermined lengths made in a continuous manner being dependent upon the speed and length of the run only.

A further advantage results from the provision of a tube-forming mill having an adjustable bending and welding die with movable walls, which will avoid overheating the die as cooled surfaces are continuously presented to the skelp during its passage therethrough, as well as providing means for continuously clearing the die of scale formed during the bending and welding, and thereby avoid danger of choking the die with scale.

A still further advantage results from the provision of a tube-forming mill having final sizing rolls and drawing and sizing rolls between the final sizing rolls and the bending and welding rolls, which are adapted to be adjusted to compensate for the adjustment of the final sizing rolls to avoid placing any slack in the tube between the bending and welding rolls and final sizing rolls during the formation thereof, and at the same time maintain that portion of the tube between the bending and welding rolls and drawing and sizing rolls under tension in order to draw the skelp through the bending and welding rolls to at least a slight degree.

Another advantage results from the provision of means for simultaneously varying the speeds of the bending and welding rolls, drawing or initial sizing rolls and the final sizing rolls, so as to vary the speed of the skelp in its passage through the furnace and thereby control the heating of the skelp.

Having now fully described my invention, what I claim and desire to protect by Letters Patent is:

1. An apparatus for forming tube from skelp in a continuous manner, comprising a furnace of sufficient length to gradually heat the skelp in its passage therethrough to a working heat, a device for bending the skelp into tubular form and forcing the edges into welding engagement adjacent to the furnace, and a drawing device beyond the bending device for drawing the formed tube and skelp in a continuous manner.

2. An apparatus for forming tube from skelp in a continuous manner, comprising a furnace of sufficient length to gradually heat the skelp in its passage therethrough to a working heat, a pair of rolls adjacent to the furnace for bending the skelp into tubular form and for forcing the edges into welding engagement, and a pair of shaping and drawing rolls beyond the welding rolls.

3. An apparatus for forming tube from skelp in a continuous manner, comprising a furnace of sufficient length to gradually heat the skelp in its passage therethrough to a working heat, a pair of rolls adjacent to the furnace for bending the skelp into tubular form and for forcing the edges into welding engagement, a pair of shaping and drawing rolls beyond the welding rolls, a pair of sizing rolls beyond the shaping and drawing rolls, and means for driving the three sets of rolls in timed relation to each other.

4. An apparatus for forming tubes from skelps in a continuous manner, comprising a furnace having skelp-admission and skelp-exit openings, means back of the first opening for supporting a roll of skelp, and means in advance of the second opening for drawing the skelp through the furnace, bending it into cylindrical form and welding the edges, whereby the length of skelp on the roll may be maintained cold and gradually heated in its passage through the furnace.

5. An apparatus for forming metallic tubing in a continuous manner from skelp, comprising means for heating the skelp to the working heat during its passage therethrough, a bell for simultaneously bending the skelp into tubular form and forcing the edges into welding contact as the skelp leaves the heating means, sizing rolls beyond the bell but adjacent thereto to size the welded tube before cooling, means for driving the rolls, and means for varying the speed of said driving means to control the heating of the skelp during its passage through the heating means.

6. An apparatus for forming metallic tubing in a continuous manner from skelp, comprising a relatively long furnace for heating the skelp to the working heat during its passage therethrough, a pair of vertical rolls for simultaneously bending the skelp into tubular form and forcing the edges into welding contact as the skelp leaves the heating means, sizing rolls beyond the welding rolls but adjacent thereto to size the welded tube before cooling, means for driving the rolls, and means for varying the speed of said driving means to control the heating of the skelp during its passage through the heating means.

7. An apparatus for forming metallic tubing in a continuous manner from skelp, comprising a relatively long furnace arranged to permit the passage therethrough of the skelp and adapted to heat the skelp to a working temperature during its passage therethrough, vertically disposed rolls adjacent to the furnace for simultaneously bending the skelp into tubular form and forcing the edges into welding contact, means for adjusting the rolls to vary the size of the pass between said rolls, horizontal rolls adjacent to the welding rolls for drawing the skelp through the furnace and vertical rolls, a second set of horizontal rolls adjacent to the first set of horizontal rolls for finally sizing the tube, means for adjusting the sizing rolls relative to each other, means for adjusting the drawing rolls relative to each other, gearing connecting all of the rolls to rotate them in timed relation to each other, driving means for said gearing, and means for varying the speed of said driving means to control the heating of the skelp.

8. An apparatus for forming tubes from skelp in a continuous manner, comprising a furnace having skelp-admission and skelp-exit openings, means back of the first opening for supporting a roll of skelp, bending and welding means in advance of the second opening, and means to draw the skelp from the roll through the furnace at different but regulatable speeds so as to elevate the skelp as it emerges from the furnace to the desired temperature notwithstanding variations in the temperature of the furnace.

9. An apparatus for forming tubes from skelp in a continuous manner, comprising a furnace of sufficient length to gradually heat the skelp in its passage therethrough to the working heat, means for simultaneously bending the skelp into cylindrical form and welding the edges to each other as it passes from the furnace, and drawing and sizing rolls beyond the bending and welding means for drawing the skelp through the furnace and bending and welding means.

10. An apparatus for forming tubes from skelp in a continuous manner, comprising a furnace of sufficient length to gradually heat the skelp in its passage therethrough to the working heat, means for supporting a reel of skelp outside the furnace in a position to be fed to the furnace as it uncoils, means for simultaneously bending the skelp into cylindrical form and welding the edges to each other as it passes from the furnace, and drawing and sizing rolls beyond the bending and welding means for drawing the skelp through the furnace and the bending and welding means.

11. An apparatus for forming tubes from skelp in a continuous manner, comprising a furnace of sufficient length to gradually heat the skelp in its passage therethrough to the working heat, means for simultaneously bending the skelp into cylindrical form and welding the edges to each other as it passes from the furnace, drawing and sizing rolls beyond the bending and welding means for drawing the skelp through the furnace and the bending and welding means, driving gearing connected to the drawing and sizing rolls, and means for varying the speed of the drive.

12. An apparatus for forming tubes from skelp in a continuous manner, comprising a furnace of sufficient length to gradually heat the skelp in its passage therethrough to the working heat, means for simultaneously bending the skelp into cylindrical form and welding the edges to each other as it passes from the furnace, drawing and sizing rolls beyond the bending and welding means for drawing the skelp through the furnace and the bending and welding means, and a cooling bed beyond the rolls arranged to maintain the tube straight during cooling.

13. A tube mill comprising a furnace for heating skelp, bending and welding rolls wherein the skelp is bent into tubular form and welded, means for drawing the skelp, and positive driving means for both the drawing means and said rolls, said rolls being arranged to rotate in vertical axes so that the opposite entering edges of the skelp will engage opposite rolls without danger of entering between the body portions of the rolls.

14. A tube mill having vertically disposed bending and welding rolls, means beyond the rolls for drawing the skelp, and means for positively driving the rolls and the drawing means.

15. An apparatus for forming tube from skelp in a continuous manner, which comprises a furnace and means in advance of the furnace for continuously drawing, an indefinitely long strip through the furnace and bending and welding it into a tube, the furnace being relatively long and of narrow cross-section and adapted to receive said continuously moving strip of indefinite length and heat every part of its length gradually as it travels therethrough from relatively cold to approximately the heat required for welding while advanced parts of the same strip are being subjected to the final tube-forming operation.

16. The apparatus defined in claim 15, in which the drawing, bending and welding means comprise a pair of positively driven drawing rolls and another pair of rolls between the first named rolls and the exit end of the furnace adapted to bend the strip into tubular form and press the edges of the strip into welding contact, the drawing rolls being mounted to turn in a horizontal axis while the bending rolls are mounted to turn on a vertical axis.

In testimony of which invention, I have hereunto set my hand, at Philadelphia, Pa., on this 15th day of May, 1922.

JOHN W. MOON.